(12) United States Patent
Fang et al.

(10) Patent No.: US 11,514,607 B2
(45) Date of Patent: Nov. 29, 2022

(54) 3-DIMENSIONAL RECONSTRUCTION METHOD, 3-DIMENSIONAL RECONSTRUCTION DEVICE, AND STORAGE MEDIUM

(71) Applicant: TSINGHUA UNIVERSITY, Beijing (CN)

(72) Inventors: Lu Fang, Beijing (CN); Dawei Zhong, Beijing (CN); Qionghai Dai, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 162 days.

(21) Appl. No.: 17/036,457

(22) Filed: Sep. 29, 2020

(65) Prior Publication Data

US 2021/0110576 A1  Apr. 15, 2021

(30) Foreign Application Priority Data

Oct. 12, 2019  (CN) .......................... 201910968740.7

(51) Int. Cl.
   *G06T 7/80*      (2017.01)
   *G06T 7/246*     (2017.01)
   *G06T 15/10*     (2011.01)
(52) U.S. Cl.
   CPC .............. *G06T 7/80* (2017.01); *G06T 7/246* (2017.01); *G06T 15/10* (2013.01); *G06T 2207/30232* (2013.01)
(58) Field of Classification Search
   CPC ........... G06T 7/80; G06T 7/246; G06T 15/10; G06T 2207/30232; G06T 7/277;
   (Continued)

(56) References Cited

U.S. PATENT DOCUMENTS 10,032,276 B1 * 7/2018 Liu .......................... G06T 7/254
2020/0334841 A1 * 10/2020 Cristobal .................. G06T 7/74
(Continued)

OTHER PUBLICATIONS

Hsiao, Ming "Dense Planar-Inertial SLAM with Structural Constraints" 2018 IEEE International Conference on Robotics and Automations (ICRA) (Year: 2018).*

*Primary Examiner* — Emily C Terrell
*Assistant Examiner* — Molly Wilburn
(74) *Attorney, Agent, or Firm* — David D. Brush; Westman, Champlin & Koehler, P.A.

(57) ABSTRACT

The disclosure provides 3D reconstruction methods and devices. The method includes: obtaining data captured by the camera and data captured by the inertial measurement unit; obtaining a pose of the camera based on the data; obtaining an adjustment value of the pose of the camera and an adjustment value of bias of the inertial measurement unit; updating the pose of the camera based on the adjustment value of the pose of the camera; determining whether the adjustment value of bias of the inertial measurement unit is less than a preset value; in response to the adjustment value of bias of the inertial measurement unit being greater than or equal to the preset value, determining that a current loop for 3-dimensional reconstruction is an error loop; removing the error loop; and constructing a 3-dimensional model for surroundings of the camera based on the updated pose of the camera and remaining loops.

20 Claims, 4 Drawing Sheets

(58) Field of Classification Search
CPC ........... G06T 15/20; G06T 2207/10024; G06T 2207/10028; G06T 2207/30244; G06T 7/579; G01C 21/32
See application file for complete search history.

(56) References Cited

U.S. PATENT DOCUMENTS

2021/0019527 A1* 1/2021 Zhang .................. G06V 10/464
2021/0396522 A1* 12/2021 Price .................. G01C 21/1654

* cited by examiner

Camera pose: 6*(N-1), IMU speed and bias: 9*(N-1),
Cam-IMU transforamtion and gravity direction: 9

|  | 6*(N-1) | 9*(N-1) | 9 |
|---|---|---|---|
| Visual error: 3*K | $J_A$ | 0 | 0 |
| Imu error: 9*(N-1) | $J_B$ | $J_C$ | $J_D$ |

$J$

|  | 6*(N-1) | 9*(N-1) | 9 |
|---|---|---|---|
|  | $J_A^T J_A + J_B^T J_B + J_E^T J_E$ | $J_B^T J_C$ | $J_B^T J_D$ |
|  | $J_C^T J_B$ | $J_C^T J_C$ | $J_C^T J_D$ |
|  | $J_D^T J_B$ | $J_D^T J_C$ | $J_D^T J_D$ |

$J^T J$

3-DIMENSIONAL RECONSTRUCTION METHOD, 3-DIMENSIONAL RECONSTRUCTION DEVICE, AND STORAGE MEDIUM

CROSS-REFERENCE TO RELATED APPLICATION

This application claims priority to Chinese Patent Application No. 201910968740.7, filed on Oct. 12, 2019, the entire contents of which are incorporated herein by reference for all purposes.

FIELD

The disclosure relates to the field of simultaneous localization and mapping (SLAM) technologies, and more particularly to a 3-dimensional (3D) reconstruction method, a 3D reconstruction device, and a computer-readable storage medium, and further more particularly to a 3D reconstruction method based on global optimization and loop closure detection.

BACKGROUND 3D reconstruction requires higher accuracy, higher efficiency and more robust as the development and application of robot indoor navigation, virtual reality and augmented reality technologies. The SLAM technologies utilize a RGBD (red, green, blue and depth) camera and an IMU (inertial measurement unit) for 3D reconstruction of corresponding surroundings. Through the combinations of visual information (from the camera) and IMU information (from the IMU), a situation of camera rapid movement and few feature points in the surroundings may be reconstructed. However, in the process of fusing the visual information and the IMU information, it needs to estimate a large number of status variables, and has a low fusion and calculation efficiency.

SUMMARY

The disclosure provides a 3-dimensional reconstruction method implemented in a portable terminal with a camera and an inertial measurement unit. The method includes: obtaining data captured by the camera and data captured by the inertial measurement unit; obtaining a pose of the camera based on the data captured by the camera and the data captured by the inertial measurement unit; obtaining an adjustment value of the pose of the camera and an adjustment value of bias of the inertial measurement unit based on a second-order statistics of the data captured by the camera and a pre-integration of the data captured by the inertial measurement unit; updating the pose of the camera based on the adjustment value of the pose of the camera; determining whether the adjustment value of bias of the inertial measurement unit is less than a preset value; in response to the adjustment value of bias of the inertial measurement unit being greater than or equal to the preset value, determining that a current loop for 3-dimensional reconstruction is an error loop, the current loop being a connection of the pose of the camera with a previous pose of the camera; removing the error loop; and constructing a 3-dimensional model for surroundings of the camera based on the updated pose of the camera and remaining loops.

The disclosure provides a 3-dimensional reconstruction device implemented in a portable terminal with a camera and an inertial measurement unit. The device includes a processor, and a memory for storing instructions executable by the processor. The processor is configured to perform the instructions stored in the memory to carry out the above method.

The disclosure provides a non-transitory computer-readable storage medium having stored therein instructions that, when executed by a processor of a terminal, causes the terminal to carry out the above method.

Additional aspects and advantages of embodiments of the disclosure will be given in part in the following descriptions, become apparent in part from the following descriptions, or be learned from the practice of the embodiments of the disclosure.

BRIEF DESCRIPTION OF THE DRAWINGS

These and other aspects and advantages of embodiments of the disclosure will become apparent and more readily appreciated from the following descriptions made with reference to the drawings, in which.

DETAILED DESCRIPTION

Figure 1:
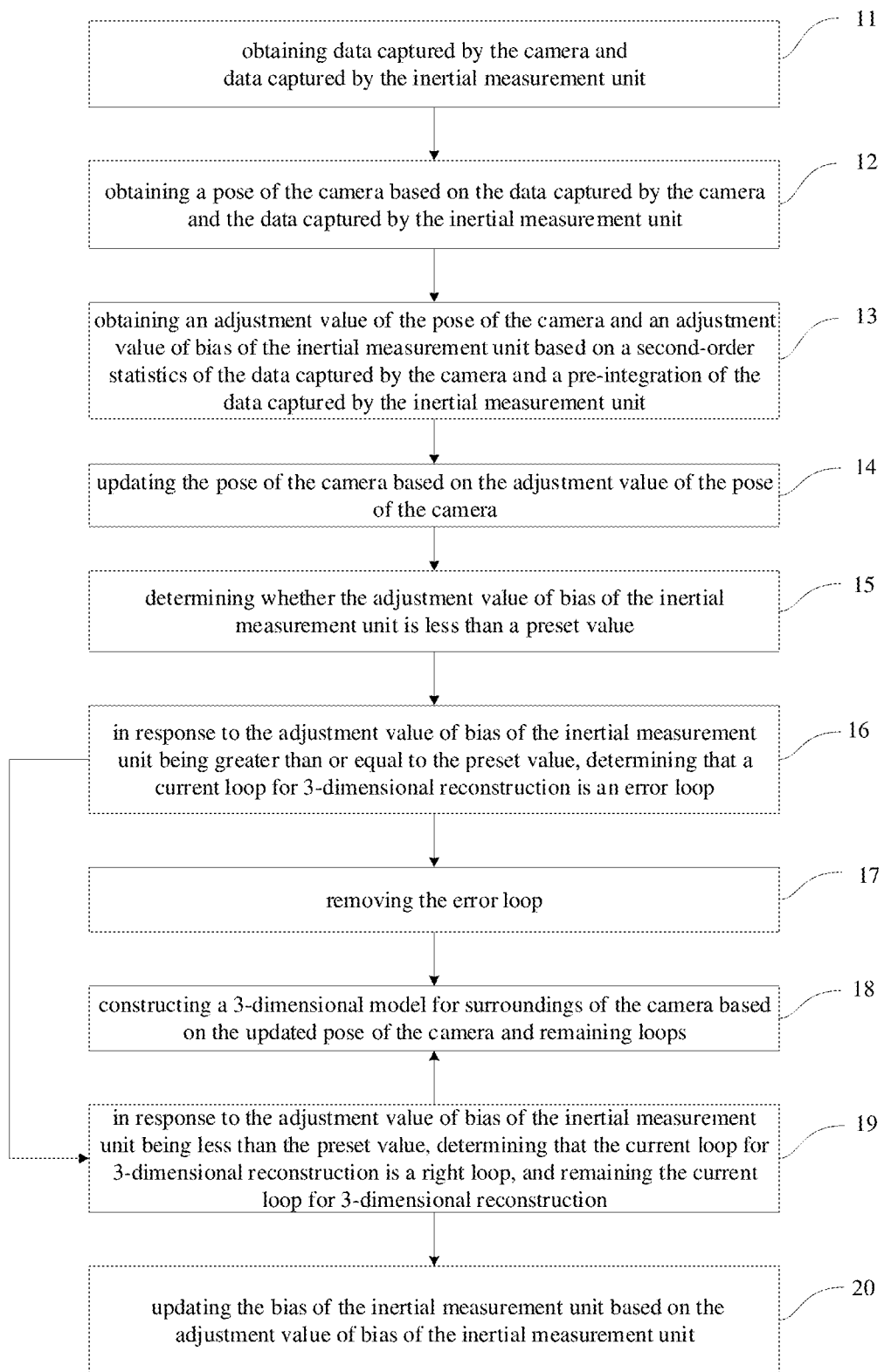
FIG. 1 is a flowchart of a 3-dimensional reconstruction method according to some embodiments of the disclosure.

Reference will be made in detail to embodiments of the disclosure. The same or similar elements and the elements having same or similar functions are denoted by like reference numerals throughout the descriptions. The embodiments described herein with reference to drawings are explanatory, illustrative, and used to generally understand the disclosure. The embodiments shall not be construed to limit the disclosure.

The fusing of visual information and IMU information may utilize extended Kalman filtering methods or optimization methods in the related art. The filtering methods have poor accuracy, and the optimization methods have poor efficiency. Furthermore, the transformation matrix of the camera and the IMU is important in the fusing process, but this matrix is usually calibrated offline or through online initialization process in the related art. In addition, the loop closure detection in the fusing process may achieve global consistency of 3D reconstruction.

In the process of fusing visual information and IMU information, it is necessary to estimate a large number of state variables. The optimization methods have poor fusion and calculation efficiency. If the real-time performance is ensured, global optimization may be not achieved, and if the global optimization is ensured, the methods cannot run on portable devices in real time.

The disclosure directly calculates the most complicated part in the optimization problem through second-order statistics of the visual information by analyzing main sources of calculation complexity in the optimization problem, and there is no accuracy loss in this accelerated calculation method, realizing real-time global optimization of vision and IMU data, and providing more accurate and robust pose estimation in 3D reconstruction. The online self-calibration is realized on the relative position of the camera and the IMU in the disclosure. The self-calibration is coupled to the global optimization, and there is no problem of cumulative errors. The accurate estimated zero-bias value for the IMU may be obtained through the global optimization of the disclosure, and the correctness of the loop detection may be determined according to changes of the estimated zero-bias value.

Figure 3:
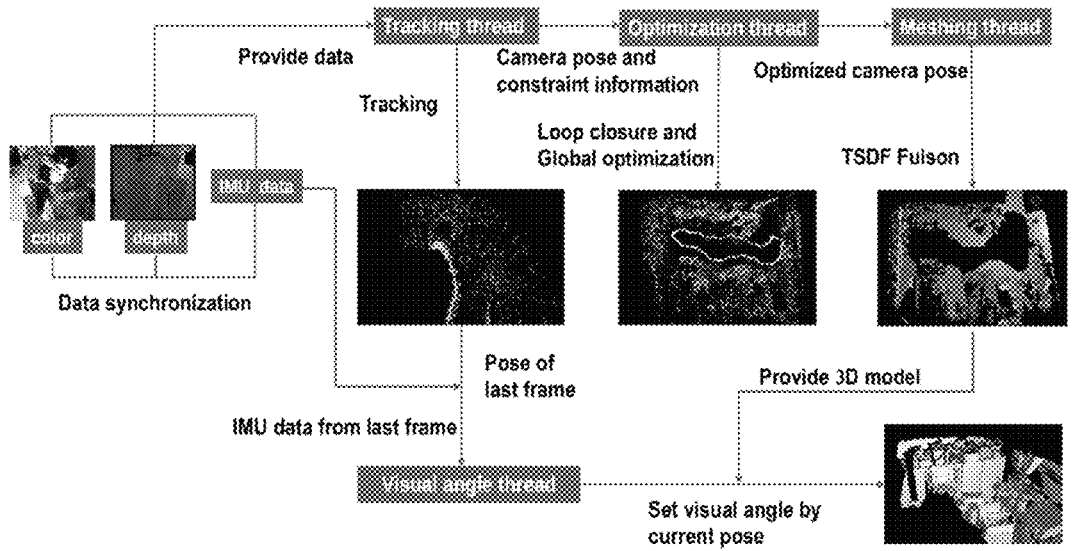
FIG. 3 is a schematic diagram showing a system structure for 3-dimensional reconstruction according to some embodiments of the disclosure.

FIG. 1 is a flowchart of a 3-dimensional reconstruction method according to some embodiments of the disclosure. In some embodiments, this method may be implemented in the portable terminal with the camera and the inertial measurement unit. As illustrated in FIG. 3, the method includes the actions in the following blocks.

At block 11, data captured by the camera and data captured by the inertial measurement unit are obtained.

At block 12, a pose of the camera is obtained based on the data captured by the camera and the data captured by the inertial measurement unit.

At block 13, an adjustment value of the pose of the camera and an adjustment value of bias of the inertial measurement unit are obtained based on a second-order statistics of the data captured by the camera and a pre-integration of the data captured by the inertial measurement unit.

At block 14, the pose of the camera is updated based on the pose adjustment value.

At block 15, it is determined whether the adjustment value of bias of the inertial measurement unit is less than a preset value.

At block 16, in response to the adjustment value of bias of the inertial measurement unit being greater than or equal to the preset value, it is determined that a current loop for 3-dimensional reconstruction is an error loop, the current loop being a connection of the pose of the camera with a previous pose of the camera.

At block 17, the error loop is removed.

At block 18, a 3-dimensional model for surroundings of the camera is constructed based on the updated pose of the camera and remaining loops.

The removing error loops may reduce the error in the constructing of the 3D model.

At block 19, in response to the adjustment value of bias of the inertial measurement unit being less than the preset value, it is determined that the current loop for 3-dimensional reconstruction is a right loop, and the current loop for 3-dimensional reconstruction is remained At block 20, in response to the adjustment value of bias of the inertial measurement unit being less than the preset value, the bias of the inertial measurement unit is updated based on the adjustment value of bias of the inertial measurement unit.

Figure 2:
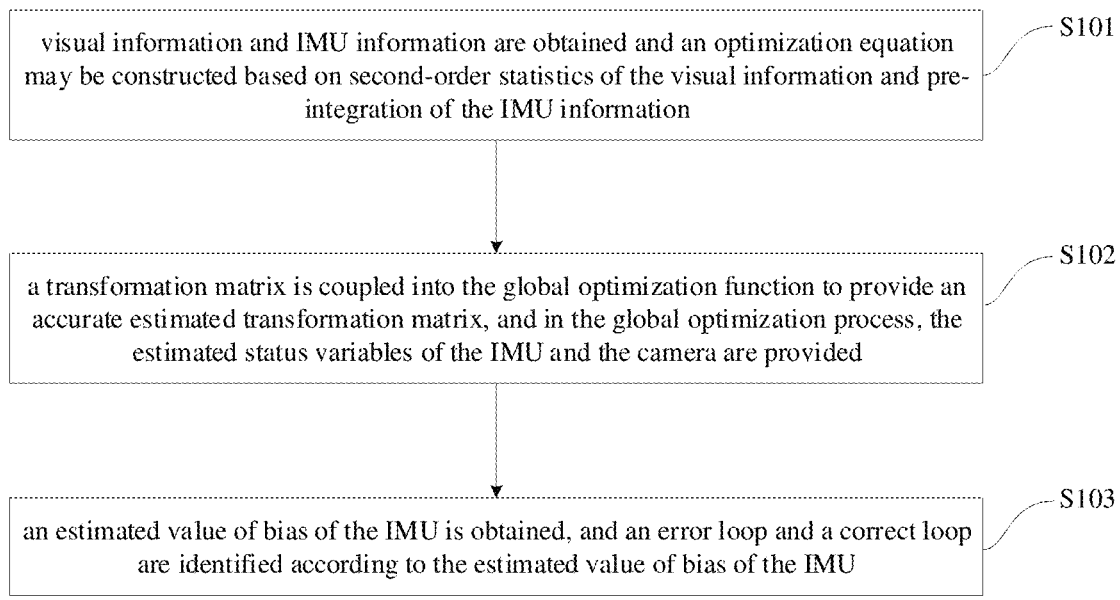
FIG. 2 is a flowchart of a 3-dimensional reconstruction method according to some embodiments of the disclosure.

FIG. 2 is a flowchart of a 3-dimensional reconstruction method according to some embodiments of the disclosure. This method may achieve high-efficiency global optimization of visual information and IMU information without loss of accuracy, may not have the problem of cumulative errors caused by inaccurate calibration, and may accurately determine correctness of loops, which is simple and easy to implement. As shown in FIG. 2, the method may include actions in the following blocks.

At block S101, visual information and IMU information are obtained. An optimization equation may be constructed based on second-order statistics of the visual information and pre-integration of the IMU information, to perform real-time online global optimization based on CPU (Central Processing Unit).

It is understandable that, as shown in FIG. 3, the global optimization of the visual information and the IMU information may be realized. The optimization equation may be constructed based on the second-order statistics of the visual information and the pre-integration of the IMU information, thereby accelerating an optimization speed greatly, and realizing the real-time online global optimization based on CPU.

In some embodiments of the disclosure, obtaining the visual information and the IMU information and constructing the optimization equation based on the second-order statistics of the visual information and the pre-integration of the IMU information may include: in an optimization process, a keyframe strategy is adopted so that status variables of keyframes participate in the global optimization, and status variables of other frames are assigned through the closest keyframe.

In detail, the keyframe strategy is adopted in the optimization, and the status variables of the keyframes participate in the global optimization, and the status variables of other frames are assigned by the closest keyframe.

The symbols may be defined as follows. The $i^{th}$ keyframe is denoted as $F_i$. $F_i$ may include a color image $I_i$ and a depth map $D_i$, which are captured by the RGBD camera. For the keyframe $F_i$, status variables that need to be optimized are $R_{ci}$, $P_{ci}$, $V_{Ii}$, $b_i^g$ and $b_i^a$, which represent a rotation of the camera, a translation of the camera, a velocity of the IMU, a bias of angular velocity of the IMU, and a bias of acceleration of the IMU, respectively. $R_{Ii}$ represents a rotation of the IMU. $P_{Ii}$ represents a translation of the IMU. $R_O$ and $P_O$ represent a Cam-IMU transformation from the camera to the IMU. g represents an initial gravity value. $R_g$ represents a direction of gravity. The Cam-IMU transformation and the direction of gravity, which are obtained through the pre-calibration or initialization process, will cause error accumulation, and slight errors will gradually be enlarged as the path grows.

Figure 4:
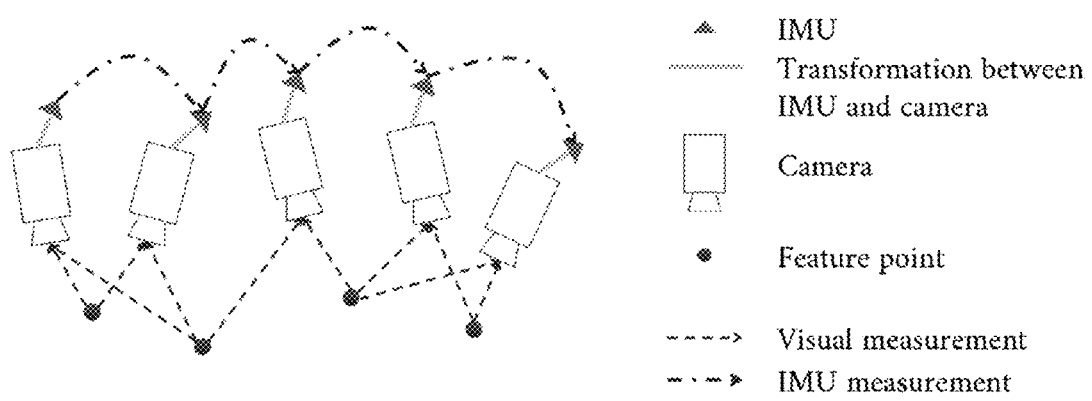
FIG. 4 is a schematic diagram showing a constraint formed by visual and IMU measurement results according to some embodiments of the disclosure.

On the other hand, the Cam-IMU transformation and the direction of gravity, obtained through the global optimization, will become more and more accurate, so as to achieve global consistency and avoid error accumulation. Therefore, in some embodiments of the disclosure, status variables of the camera (i.e., $R_{ci}$, $P_{ci}$, $V_{Ii}$, $b_i^g$ and $b_i^a$), the Cam-IMU transformation (i.e., $R_O$ and $P_O$) and the direction of gravity $R$ may be estimated in an overall global optimization function. In order to simplify representations, all variables to be optimized are denoted as $S$, in which $S=\{R,P,V,b^g,b^a,R_O, P_O,R_g\}$, where $\{R,P,V,b^g,b^a\}=\{R_{ci}, P_{ci}, V_{Ii}, b_i^g, b_i^a, i=0, \ldots, N-1\}$, and $N$ represents the number of the keyframes. Sequential IMU measurements between nearby frames are integrated to obtain an IMU constraint (or a motion constraint) $C_{i,j+1}^I$. A visual constraint $C_{i,j}^F$ may be obtained from registered frame pairs. All registered frame pairs may be denoted as $\Omega$. The constraint relationship formed by the visual and IMU measurements may be shown in FIG. 4.

At block S102, a transformation matrix (i.e., the Cam-IMU transformation) is coupled into the global optimization function to provide an accurate estimated transformation matrix, and in the global optimization process, the estimated status variables of the IMU and the camera are provided, so that the IMU information may be used for positioning when fast moving and few feature points exist, so as to continue mapping.

It is understandable that, as shown in FIG. 3, the optimization of the transformation matrix is coupled in the global optimization function, which may realize online calibration without visual initialization. The optimization of the transformation matrix will become more and more accurate, avoiding error accumulation. The global optimization provides accurate estimated status, so that the system may continue to map when the system is moving fast and there are few feature points in the surrounding of the system. In the meshing thread, TSDF (truncated signed distance function) fusion provides a 3D model.

Further, in some embodiments of the disclosure, the global optimization process further includes: obtaining Jacobian matrixes according to error terms of the visual information and the IMU information; minimizing an error function according to the Jacobian matrixes, and obtaining update amounts of the status variable through sparse matrix multiplication to realize the global optimization of visual information and IMU information.

It is understandable that, in the global optimization of visual information and IMU information, the second-order statistics of visual feature points may be used to construct the Jacobian matrix of the visual part, and combined with the pre-integration of the IMU information to construct the overall optimization equation. This greatly accelerates the calculation speed of global optimization. The transformation matrix of the camera and the IMU is coupled in the global optimization function, so that self-calibration is realized in the global optimization, and there is no problem of calibration error accumulation.

In detail, camera status variables and global variables $S=\{R, P, V, b^g, b^a, R_0, P_0, R\}$ may be estimated based on the following formula of:

$$S^* = \underset{S}{\arg\min} \sum_{i=0}^{N-1} C_{i,i+1}^I(S) + \sum_{(i,j)\in\Omega}^n \lambda_1 C_{i,j}^F(S), \quad (1)$$

where, $\lambda_1$ represents a coefficient constant, and n represents the number of the registered frame pairs.

After obtaining the formula (1), a Gauss-Newton optimization method is used to calculate the update amounts of the status and global variables, to realize minimizing the formula (1), based on the following formula of:

$$\delta = -(J(\xi)^T J(\xi))^{-1} J(\xi)^T r(\xi) \quad (2),$$

where, $\xi$ represents the status and global variables, $J(\xi)$ represents a Jacobian matrix obtained by the function (1) deriving all the status and global variables, $r(\xi)$ represents an error term obtained by the function (1), and $\delta$ represents the obtained update amounts. The calculation process of $J(\xi)^T J(\xi)$ and $J(\xi)^T r(\xi)$ is main sources of calculation complexity in the optimization problem. The acceleration and decomposition process for $J(\xi)^T J(\xi)$ is described below. Meanwhile, $J(\xi)^T r(\xi)$ may be accelerated by the same method as $J(\xi)^T J(\xi)$.

Figures 5, 6:
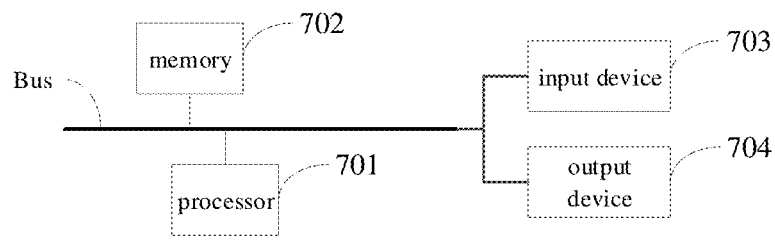
FIG. 5 is a schematic diagram showing a Jacobian in a Gauss-Newton function according to some embodiments of the disclosure.
FIG. 6 is a schematic diagram showing an electronic device for implementing solutions according to some embodiments of the disclosure.

It may be seen from FIG. 5 that the overall Jacobian matrix $J(\xi)$ is a combination of the Jacobian matrix obtained by the visual error term and the Jacobian matrix obtained by the IMU error term. The computational complexity of $C^F$ is $O(k*N_{corr})$, and the computational complexity of $C^I$ is $O(N)$, where N is the number of keyframes, $N_{corr}$ is the number of registered frame pairs, and k is an average number of matched feature point pairs for each registered frame pair. The number of keyframes is much smaller than the number of matched feature point pairs, so the computational complexity of the optimization problem mainly lies in $C^F$, i.e., the computational cost of $J^T J$ is mainly in $J_A^T J_A$ of FIG. 5. The key to speeding up calculations is to speed up calculations on $J_A^T J_A$. $J_A$ is the Jacobian matrix of matched feature point pairs. $J_A^T J_A$ may be directly obtained through the second-order statistics of matched feature points in the disclosure, and the computational complexity of $C^F$ is reduced from $O(k*N_{corr})$ to $O(N_{corr})$ without loss of accuracy, thereby significantly reducing computational complexity of $J^T J$. The following is the specific method of calculating $J_A^T J_A$ by second-order statistics.

For each frame pair $(F_i, F_j)$, matched feature points $C_{i,j}=\{C_{i,j}^k=(p_i^k, p_j^k)\}$ may be obtained based on feature matching, where $p_i^k$ represents coordinates of the $k^{th}$ feature point observed in the $i^{th}$ frame, and $p_j^k$ represents coordinates of the $k^{th}$ feature point observed in the $j^{th}$ frame. For the $i^{th}$ frame, $T_{ci}$ represents a rigid transformation matrix in Euclidean space which can be represented by Lie algebra $\xi_i$ on the SE3 manifold. $\xi_i$ represents a corresponding Lie algebra. $R_{ci}$ represents a rotation part of the rigid transformation matrix and $P_{ci}$ represents a translation part of the rigid transformation matrix. $T_{ci}=[R_{ci}|P_{ci}]$. After finding the matched feature point pairs in the frame pairs, for each matched feature point pair, the residual for every corresponding point may be obtained by a formula of:

$$r_{i,j}^k(\xi) = T(\xi_i)P_i^k - T(\xi_j)P_j^k \quad (3).$$

By combining all the residual of corresponding points, the feature correspondence constraint may be obtained by a formula of:

$$C_{i,j}^F = \sum_{k=0}^{\|C_{i,j}\|-1} \|T_i P_i^k - T_j P_j^k\|^2, \quad (4)$$

where, $P_i^k$ represents homogeneous coordinates of point coordinates $p_i^k$ under the camera coordinate system for the $i^{th}$ frame; $P_j^k$ represents homogeneous coordinates of point coordinates $p_j^k$ under the camera coordinate system for the $j^{th}$ frame; a camera pose $T_0$ of the first frame is set to an unit matrix, thereby initializing the world coordinate system. For visual initialization, the pose estimation may be obtained by minimizing the formula (4). For adjacent keyframes $F_i$ and $F_j$, the pose $R_{ci}$, $P_{ci}$ and the pose $R_{cj}$, $P_{cj}$ may be obtained visually.

A Jacobian matrix for derivation of pose $R_{ci}$, $P_{ci}$ with respect to $r_{i,j}^k(\xi)$ may be denoted as follows:

$$J_i^k(\xi_i) = [I_{3*3} - [R(\Phi_i)P_i^i]^\wedge] \quad (5).$$

A following submatrix may be obtained for one feature point pair between frame i and frame j, as a formula of:

$$J_m = [0 \ldots J_i^k(\xi_i) \ldots 0 \ldots J_j^k(\xi_j) \ldots 0] \quad (6).$$

For a corresponding frame pair between frame i and frame j, the Jacobian product $J_{C_{i,j}}^T J_{C_{i,j}}$ is the summation of all matched feature point submatrices as a formula of:

$$J_{C_{i,j}}^T J_{C_{i,j}} = \sum_{m \in C_{i,j}} J_m^T J_m. \quad (7)$$

There are many corresponding frame pairs in the visual observation and $J_{C_{i,j}}^T J_{C_{i,j}}$ is a submatrix of the original Jacobian matrix $J_A^T J_A$, which is shown as follows:

$$J_A^T J_A = \Sigma J_{C_{i,j}}^T J_{C_{i,j}} \qquad (8).$$

$J_m$ has two non-zero 3×6 matrices, so $J_m^T J_m (m \in C_{i,j})$ has four non-zero 6×6 matrices at the same blocks. As the summation of $J_m^T J_m$, $J_{C_{i,j}}^T J_{C_{i,j}}$ has four non-zero 6×6 matrices too and can be calculated by the second-order statistics of the structure terms. The four non-zero 6×6 matrices are denoted by $A_{C_{i,j}}(i,i)$, $A_{C_{i,j}}(i,j)$, $A_{C_{i,j}}(j,i)$, and $A_{C_{i,j}}(j,j)$. The calculation process of $A_{C_{i,j}}(i,j)$ may be shown as follows and the other sub-matrices may be calculated in the same way:

$$A_{C_{i,j}}(i,j) = \sum_{k=0}^{\|C_{i,j}\|-1} J_{ik}^T J_{jk} = \begin{bmatrix} \|C_{i,j}\| I_{3\times 3} & -\left[R_j \sum_{k=0}^{\|C_{i,j}\|-1} P_j^k\right]_x \\ -\left[R_i \sum_{k=0}^{\|C_{i,j}\|-1} P_i^k\right]_x & \sum_{k=0}^{\|C_{i,j}\|-1} [R_i P_i^k]_x^T [R_j P_j^k]_x \end{bmatrix}. \qquad (9)$$

The result of $J_{C_{i,j}}^T J_{C_{i,j}}$ may be obtained directly from the second-order statistic of vision through the formula (9), and $J_A^T J_A$ is the summation of $J_{C_{i,j}}^T J_{C_{i,j}}$. In this way, the result of $J_A^T J_A$ may be obtained by the second-order statistics of vision, and the calculation complexity of each Jacobian matrix of the vision part is greatly reduced.

The following describes the calculation process of the Jacobian matrix of the IMU part.

The transformation matrix (i.e., the Cam-IMU transformation matrix) $R_0$ and $P_0$, may be used to obtain the following transformation through the following formula of:

$$R_{Ii} = R_{ci} R_0,$$

$$P_{Ii} = P_{ci} + R_{ci} P_0 \qquad (10).$$

The angular velocity and acceleration obtained by the IMU are denoted as $\tilde{\omega}$ and $\tilde{\alpha}$, the actual angular velocity and acceleration are denoted as $\omega$ and $\alpha$, and the noise of the angular velocity and acceleration are denoted as $\eta^g$ and $\eta^a$. These parameters have the following relations of:

$$\tilde{\omega}(t) = \omega(t) + b^g(t) + \eta^g(t)$$

$$\tilde{\alpha}(t) = R_I^T(t)(a(t)-g) + b^a(t) + \eta^a(t) \qquad (11).$$

Assuming that the angular velocity and acceleration remain unchanged at the moment $t$–$[t+\Delta t]$, the status at the moment $t+\Delta t$ may be obtained from the status at the moment $t$ by the following formula of:

$$R_I(t+\Delta t) = R_I(t) \mathrm{Exp}(\omega(t)\Delta t),$$

$$V_I(t+\Delta t) = V_I(t) + a(t)\Delta t,$$

$$P_I(t+\Delta t) = P_I(t) + V_I(t)\Delta t + \tfrac{1}{2} a(t) \Delta t^2, \qquad (12).$$

The formula (11) is brought into the formula (12), the following relationship may be obtained:

$$R_I(t+\Delta t) = R_I(t) \mathrm{Exp}((\tilde{\omega}(t) - b^g(t) - \eta^{gd}(t))\Delta t),$$

$$V_I(t+\Delta t) = V_I(t) + g\Delta t + R_I(t)(\tilde{\alpha}(t) - b^a(t) - \eta^{ad}(t))\Delta t,$$

$$P_I(t+\Delta t) = P_I(t) + V_I(t)\Delta t + \tfrac{1}{2} g \Delta t^2 + \tfrac{1}{2} R_I(t)(\tilde{\alpha}(t) - b^a(t) - \eta^{ad}(t))\Delta t^2, \qquad (13).$$

The pose relationship from the moment $i$ to the moment $j$ may be obtained through the integration of multiple pieces of IMU data by the formula of:

$$R_{Ij} = R_{Ii} \prod_{k=i}^{j-1} \mathrm{Exp}((\tilde{\omega}_k - b_k^g - \eta_k^g)\Delta t), \qquad (14)$$

$$V_{Ij} = V_{Ii} + g\Delta t_{ij} + \sum_{k=i}^{j-1} R_k (\tilde{\alpha}_k - b_k^a - \eta_k^{ad})\Delta t,$$

$$P_{Ij} = P_{Ii} + \sum_{k=i}^{j-1} v_k \Delta t + \tfrac{1}{2} g \Delta t_{ij}^2 + \tfrac{1}{2} \sum_{k=i}^{j-1} R_k (\tilde{\alpha}_k - b_k^a - \eta_k^a)\Delta t^2, .$$

In order to avoid repeated integration, the following pose changes may be calculated by the formula of:

$$\Delta R_{ij} B R_i^T R_j = \prod_{k=i}^{j-1} \mathrm{Exp}((\tilde{\omega}_k - b_k^g - \eta_k^g)\Delta t), \qquad (15)$$

$$\Delta V_{ij} B R_i^*(v_j - v_i - g\Delta t_{ij}) = \sum_{k=i}^{j-1} \Delta R_{ik} (\tilde{\alpha}_k - b_k^a - \eta_k^a)\Delta t,$$

$$\Delta P_{ij} B R_i^* \left( p_j - p_i - v_i \Delta t_{ij} - \tfrac{1}{2} g \Delta t_{ij}^2 \right) =$$

$$\sum_{k=i}^{j-1} \left[ \Delta v_{ik} \Delta t + \tfrac{1}{2} \Delta R_{ik} (\tilde{\alpha}_k - b_k^a - \eta_k^a)\Delta t^2 \right] =$$

$$\sum_{k=i}^{j-1} \left[ \tfrac{3}{2} \Delta R_{ik} (\tilde{\alpha}_k - b_k^a - \eta_k^a)\Delta t^2 \right] t, .$$

The noise may be separated by the following way:

$$\Delta \tilde{R}_{ij} = \prod_{k=i}^{j-1} \mathrm{Exp}((\tilde{\omega}_k - b_k^g)\Delta t), \qquad (16)$$

$$\Delta R_{ij}; \Delta \tilde{R}_{ij} \prod_{k=i}^{j-1} \mathrm{Exp}\left(-\Delta \tilde{R}_{k+1,j} J_r^k \eta_k^{gd} \Delta t\right), .$$

$\Delta \tilde{V}_{ij\ ij}$ and $\Delta \tilde{P}_{ij\ ij}$ may be obtained by the same method.

After obtaining the camera pose through the visual method, the pose of the IMU may be obtained by conversion, so that the following pose changes are denoted between adjacent keyframes by the formula of:

$$\Delta R_{ij} = R_{Ii}^T R_{Ij},$$

$$\Delta V_{ij} B R_{Ii}^*(V_{Ij} - V_{Ii} - g\Delta t_{ij}),$$

$$\Delta P_{ij} B R_{Ii}^*(P_{Ij} - P_{Ii} - V_{Ii}\Delta t_{ij} - \tfrac{1}{2} g \Delta t_{ij}^2), \qquad (17).$$

At the same time, the relative pose changes $\Delta \tilde{R}_{ij\ ij}$, $\Delta \tilde{V}_{ij\ ij}$, and $\Delta \tilde{P}_{ij\ ij}$ between keyframes may be obtained through the integration of IMU data, and the following error function may be obtained by combining the formula (17):

$$r_{VR_{ij}} = \mathrm{Log}(\Delta R_{ij} A \tilde{R}_{ij\ ij}),$$

$$r_{VV_{ij}} = \Delta V_{ij} - \Delta \tilde{V}_{ij\ ij}, \text{ and}$$

$$r_{VP_{ij}} = \Delta P_{ij} - \Delta \tilde{P}_{ij\ ij}, \qquad (18).$$

By linearizing the zero offset, the formula (18) may be denoted as follows:

$$r_{VR_{ij}} = \underset{\sim}{\&} \text{Log}\left(\left(V\tilde{R}_{ij}^g(\overline{b}_i^g)\text{Exp}\left(\frac{\partial V\overline{R}_{ij}}{\partial b^g}\delta b^g\right)\right)^T R_{li}^T R_{lj}\right), \quad (19)$$

$$r_{VV_{ij}} \underset{\sim}{\&} R_{li}^T(V_{lj} - V_{li} - gVt_{ij}) - \left[V\tilde{V}_{ij}^g(\overline{b}_i^g, \overline{b}_i^a) + \frac{\partial V\overline{V}_{ij}}{\partial b^g}\delta b^g + \frac{\partial V\overline{V}_{ij}}{\partial b^a}\delta b^a\right]$$

$$r_{VP_{ij}} \underset{\sim}{\&} R_{li}^T\left(P_{lj} - P_{li} - V_{li}Vt_{ij} - \frac{1}{2}gVt_{ij}^2\right) -$$

$$\left[V\tilde{P}_{ij}^g(\overline{b}_i^g, \overline{b}_i^a) + \frac{\partial V\overline{P}_{ij}}{\partial b^g}\delta b^g + \frac{\partial V\overline{P}_{ij}}{\partial b^a}\delta b^a\right], .$$

The formula (10) may be used to bring in the camera pose, and $R_g$ may be replaced by $R_g g$ to obtain the following formula (20):

$$r_{VR_{ij}} \underset{\sim}{\&} \text{Log}\left(\left(V\tilde{R}_{ij}^g(\overline{b}_i^g)\text{Exp}\left(\frac{\partial V\overline{R}_{ij}}{\partial b^g}\delta b^g\right)\right)^T (R_{ci}R_0)^T R_{cj}R_0\right), \quad (20)$$

$$r_{VV_{ij}} \underset{\sim}{\&} (R_{ci}R_0)^T(V_{lj} - V_{li} - R_g gVt_{ij}) -$$

$$\left[V\tilde{V}_{ij}^g(\overline{b}_i^g, \overline{b}_i^a) + \frac{\partial V\overline{V}_{ij}}{\partial b^g}\delta b^g + \frac{\partial V\overline{V}_{ij}}{\partial b^a}\delta b^a\right],$$

$$r_{VP_{ij}} \underset{\sim}{\&} (R_{ci}R_0)^T\left(P_{ci} + R_{cj}P_0 - (P_{ci} + R_{ci}P_0) - V_{li}Vt_{ij} - \frac{1}{2}R_0R_g gVt_{ij}^2\right) -$$

$$\left[V\tilde{P}_{ij}^g(\overline{b}_i^g, \overline{b}_i^a) + \frac{\partial V\overline{P}_{ij}}{\partial b^g}\delta b^g + \frac{\partial VP_{ij}}{\partial b^a}\delta b^a\right], .$$

In some embodiments of the disclosure, the method further includes: obtaining derivatives of errors with respect to status variables to be optimized through a disturbance model of Lie algebra.

In detail, the Jacobian matrix of the error ($r_{\Delta R_{ij}}$, $r_{\Delta V_{ij}}$, $r_{\Delta P_{ij}}$) relative to the status variables (S={R, P, V, $b^g$, $b^a$, $R_0$, $P_0$, $R_g^f$}) that needs to be optimized may be obtained through the disturbance model of Lie algebra. The global variables $R_0$, $P_0$ and $R_g$ are tightly coupled in the global optimization function, thus realizing self-calibration in the global optimization process, and the calibration result will not cause error accumulation. The Jacobian matrix of the IMU error term may be obtained, i.e., $J_B$, $J_C$ and $J_D$ in FIG. 5, and may be combined with $J_A^T J_A$, to obtain $J(\xi)^T J(\xi)$ in FIG. 5. $J(\xi)^T r(\xi)$ may be obtained in the same way. The update amounts δ may be obtained through sparse matrix multiplication, thus realizing the global optimization of visual and IMU information At block S103, an estimated value of bias of the IMU is obtained, and an error loop and a correct loop are identified according to the estimated value of bias of the IMU.

It is understandable that the correctness of loop detection is detected by the estimated value of bias of the IMU, so that the system may accurately identify error and correct loops. When loops are detected, the global consistency of vision and IMU is achieved through global optimization of the IMU. That is, with the embodiments of the disclosure, the removal of the error loop may be realized through the change of bias of the IMU, thereby accurately identifying the correct loop and the error loop.

In detail, the error loop may be detected, which may achieve the global consistency of the mapping. The wrong error loop detection will destroy this global consistency. When the correct loop detection occurs, the estimated value of bias will not change largely, and the when the wrong loop detection occurs, the consistency of the mapping is destroyed. In order to fit the unreasonable deformation of the trajectory when the error loop occurs, the update amount of the bias of the IMU will suddenly increase. Therefore, the correctness of the current loop detection may be judged according to the change of the bias of the IMU. If there is a sudden change in the bias of the IMU, the current loop detection is cancelled, so that accurate error loop removal may be achieved and the robustness of the system is improved.

In summary, the purpose of the embodiments of the disclosure is to analyze the sources of the main complexity in the global optimization, to realize accelerated calculations through derivation, to greatly reduce the overall computational complexity, and to realize real-time global optimization of visual and IMU information based on CPU, which ensures global consistency and enables the system to run on portable devices. At the same time, the tightly coupled self-calibration is added to the global optimization, which avoids the complicated process and error accumulation of offline calibration, and also avoids the error problem of the initialization process. After obtaining an accurate estimated value of the bias of the IMU through global optimization, the error loop and the correct loop are accurately identified through the change of the bias of the IMU.

It should be noted that the embodiments of the disclosure may realize the method for global optimization and determining an error loop in 3-dimensional reconstruction by changing the design, for example, constructing the Jacobian matrix of visual optimization through the statistics of visual information, and only performing visual optimization; changing the arrangement structure of the overall Jacobian matrix during the global optimization of vision and IMU; judging the operating status of the system through the change of bias of the IMU and checking the correctness of visual tracking. In addition, the embodiments of the disclosure also have other uses, for example, when the visual and IMU information are jointly optimized, the method is used to accelerate the calculation.

With the method for global optimization and determining an error loop in 3-dimensional reconstruction, provided in the embodiments of the disclosure, high-efficiency global optimization of visual and IMU information is realized without loss of accuracy, and the system may run on portable devices in real time. Tightly coupled self-calibration may obtain accurate camera and IMU transformation matrices and there is no problem of accumulated error caused by inaccurate calibration. The accurate loop correctness can be judged based on the changes of bias of the IMU obtained by optimization, which is simple and easy to be achieved.

According to the embodiments of the disclosure, the disclosure also provides an electronic device and a readable storage medium.

FIG. 6 is a block diagram of an electronic device for implementing the above method according to some embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the electronic device includes: one or more processors 701, a memory 702, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 701 is taken as an example in FIG. 6.

The memory 702 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 702 is configured to store non-transitory software programs, non-transitory computer executable programs and modules, such as program instructions/modules corresponding to the method in the embodiments of the disclosure. The processor 701 executes various functional applications and data processing of the server by running non-transitory software programs, instructions, and modules stored in the memory 702, that is, implementing the method in the foregoing method embodiment.

The memory 702 may include a storage program area and a storage data area, where the storage program area may store an operating system and application programs required for at least one function. The storage data area may store data created according to the use of the electronic device, and the like. In addition, the memory 702 may include a high-speed random-access memory, and a non-transitory memory, such as at least one magnetic disk storage device, a flash memory device, or other non-transitory solid-state storage device. In some embodiments, the memory 702 may optionally include a memory remotely disposed with respect to the processor 701, and these remote memories may be connected to the electronic device through a network. Examples of the above network include, but are not limited to, the Internet, an intranet, a local area network, a mobile communication network, and combinations thereof.

The electronic device for implementing the above method may further include: an input device 703 and an output device 704. The processor 701, the memory 702, the input device 703, and the output device 704 may be connected through a bus or in other manners. In FIG. 6, the connection through the bus is taken as an example.

The input device 703 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 704 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general-purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

It should be understood that various forms of processes shown above may be used to reorder, add, or delete steps. For example, the steps described in the disclosure may be performed in parallel, sequentially, or in different orders. As long as the desired results of the technical solutions disclosed in the disclosure can be achieved, no limitation is made herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A 3-dimensional reconstruction method, implemented in a portable terminal with a camera and an inertial measurement unit, and the method comprising:
    obtaining data captured by the camera and data captured by the inertial measurement unit;
    obtaining a pose of the camera based on the data captured by the camera and the data captured by the inertial measurement unit;
    obtaining an adjustment value of the pose of the camera and an adjustment value of bias of the inertial measurement unit based on a second-order statistics of the data captured by the camera and a pre-integration of the data captured by the inertial measurement unit;
    updating the pose of the camera based on the adjustment value of the pose of the camera;
    determining whether the adjustment value of bias of the inertial measurement unit is less than a preset value;
    in response to the adjustment value of bias of the inertial measurement unit being greater than or equal to the preset value, determining that a current loop for 3-dimensional reconstruction is an error loop, the current loop being a connection of the pose of the camera with a previous pose of the camera;
    removing the error loop; and
    constructing a 3-dimensional model for surroundings of the camera based on the updated pose of the camera and remaining loops.

2. The method as claimed in claim 1, further comprising:
    in response to the adjustment value of bias of the inertial measurement unit being less than the preset value, determining that the current loop for 3-dimensional reconstruction is a right loop, and remaining the current loop for 3-dimensional reconstruction.

3. The method as claimed in claim 2, further comprising:
    in response to the adjustment value of bias of the inertial measurement unit being less than the preset value, updating the bias of the inertial measurement unit based on the adjustment value of bias of the inertial measurement unit.

4. The method as claimed in claim 1, wherein the camera comprises an RGB-depth camera.

5. The method as claimed in claim 4, wherein the data captured by the camera comprises a plurality of color images and depth maps, and the data captured by the inertial measurement unit comprises a plurality of inertial data, each of the plurality of color images and depth maps corresponding to one of the plurality of inertial data.

6. The method as claimed in claim 5, wherein obtaining the adjustment value of the pose of the camera based on the second-order statistics of the data captured by the camera and the pre-integration of the data captured by the inertial measurement unit, comprises:
    obtaining the adjustment value of the pose of the camera based on a Jacobian matrix formed based on the second-order statistics of the data captured by the camera and the pre-integration of the data captured by the inertial measurement unit.

7. The method as claimed in claim 6, wherein,
    the Jacobian matrix comprising a visual Jacobian matrix and an inertial Jacobian matrix,
    the visual Jacobian matrix comprises a sum of a plurality of sub visual Jacobian matrices, and is denoted by the following formula of:

$$J(\xi)^T J(\xi) = \Sigma J_{C_{i,j}}{}^T J_{C_{i,j}},$$

where, $J(\xi)^T J(\xi)$ represents the visual Jacobian matrix, $\xi$ represents the pose of the camera, $J_{C_{i,j}}{}^T J_{C_{i,j}}$ represents the sub visual Jacobian matrix, and is denoted by the following formula of:

$$J_{C_{i,j}}^T J_{C_{i,j}} = \begin{bmatrix} A_{C_{i,j}}(i,i), A_{C_{i,j}}(i,j) \\ A_{C_{i,j}}(j,i), A_{C_{i,j}}(j,j) \end{bmatrix},$$

$C_{i,j}$ represents a set of matched feature points in a registered frame pair of frames i and j of color images and depth maps, $$A_{C_{i,j}}(i,i) = \sum_{k=0}^{\|C_{i,j}\|-1} J_{ik}^T J_{ik} = \begin{bmatrix} \|C_{i,j}\|I_{3\times 3} & -\left[R_i \sum_{k=0}^{\|C_{i,j}\|-1} P_i^k\right]_x \\ -\left[R_i \sum_{k=0}^{\|C_{i,j}\|-1} P_i^k\right]_x & \sum_{k=0}^{\|C_{i,j}\|-1} [R_i P_i^k]_x^T [R_i P_i^k]_x \end{bmatrix},$$

$$A_{C_{i,j}}(i,j) = \sum_{k=0}^{\|C_{i,j}\|-1} J_{ik}^T J_{ik} = \begin{bmatrix} \|C_{i,j}\|I_{3\times 3} & -\left[R_j \sum_{k=0}^{\|C_{i,j}\|-1} P_j^k\right]_x \\ -\left[R_i \sum_{k=0}^{\|C_{i,j}\|-1} P_i^k\right]_x & \sum_{k=0}^{\|C_{i,j}\|-1} [R_i P_i^k]_x^T [R_j P_j^k]_x \end{bmatrix},$$

$$A_{C_{j,i}}(j,i) = \sum_{k=0}^{\|C_{i,j}\|-1} J_{jk}^T J_{ik} = \begin{bmatrix} \|C_{i,j}\|I_{3\times 3} & -\left[R_i \sum_{k=0}^{\|C_{i,j}\|-1} P_i^k\right]_x \\ -\left[R_j \sum_{k=0}^{\|C_{i,j}\|-1} P_j^k\right]_x & \sum_{k=0}^{\|C_{i,j}\|-1} [R_j P_j^k]_x^T [R_i P_i^k]_x \end{bmatrix},$$

$$A_{C_{j,j}}(j,j) = \sum_{k=0}^{\|C_{i,j}\|-1} J_{jk}^T J_{jk} = \begin{bmatrix} \|C_{i,j}\|I_{3\times 3} & -\left[R_j \sum_{k=0}^{\|C_{i,j}\|-1} P_j^k\right]_x \\ -\left[R_j \sum_{k=0}^{\|C_{i,j}\|-1} P_j^k\right]_x & \sum_{k=0}^{\|C_{i,j}\|-1} [R_j P_j^k]_x^T [R_j P_j^k]_x \end{bmatrix},$$

k represents the matched feature point, $\|C_{i,j}\|$ represents a number of the set of matched feature points, $I_{3\times3}$ represents a unit matrix of 3×3, $R_j$ represents a rotation matrix of frame j, $R_i$ represents a rotation matrix of frame i, $P_j^k$ represents a point coordinate of matched feature point k in frame j, $P_i^k$ represents a point coordinate of matched feature point k in frame i, x represents a skew symmetric matrix.

8. The method as claimed in claim 7, wherein the inertial Jacobian matrix is obtained by:

obtaining a residual function of inertial status variables by combining the pose of the camera; and obtaining the inertial Jacobian matrix of the residual function to the pose of the camera and the inertial status variables.

9. The method as claimed in claim 8, wherein the adjustment value of the pose of the camera is a sum of the visual Jacobian matrix and the inertial Jacobian matrix, and the adjustment value of bias of the inertial measurement unit is obtained based on the inertial Jacobian matrix.

10. A 3-dimensional reconstruction device, implemented in a portable terminal with a camera and an inertial measurement unit, and the device comprising:

a processor; and a memory for storing instructions executable by the processor, wherein the processor is configured to carry out:

obtaining data captured by the camera and data captured by the inertial measurement unit;

obtaining a pose of the camera based on the data captured by the camera and the data captured by the inertial measurement unit;

obtaining an adjustment value of the pose of the camera and an adjustment value of bias of the inertial measurement unit based on a second-order statistics of the data captured by the camera and a pre-integration of the data captured by the inertial measurement unit;

updating the pose of the camera based on the adjustment value of the pose of the camera;

determining whether the adjustment value of bias of the inertial measurement unit is less than a preset value;

in response to the adjustment value of bias of the inertial measurement unit being greater than or equal to the preset value, determining that a current loop for 3-dimensional reconstruction is an error loop, the current loop being a connection of the pose of the camera with a previous pose of the camera;

removing the error loop; and constructing a 3-dimensional model for surroundings of the camera based on the updated pose of the camera and remaining loops.

11. The device as claimed in claim 10, wherein the processor is further configured to carry out:

in response to the adjustment value of bias of the inertial measurement unit being less than the preset value, determining that the current loop for 3-dimensional reconstruction is a right loop, and remaining the current loop for 3-dimensional reconstruction.

12. The device as claimed in claim 11, wherein the processor is further configured to carry out:

in response to the adjustment value of bias of the inertial measurement unit being less than the preset value, updating the bias of the inertial measurement unit based on the adjustment value of bias of the inertial measurement unit.

13. The device as claimed in claim 10, wherein the camera comprises an RGB-depth camera.

14. The device as claimed in claim 13, wherein the data captured by the camera comprises a plurality of color images and depth maps, and the data captured by the inertial measurement unit comprises a plurality of inertial data, each of the plurality of color images and depth maps corresponding to one of the plurality of inertial data.

15. The device as claimed in claim 14, wherein obtaining the adjustment value of the pose of the camera based on the second-order statistics of the data captured by the camera and the pre-integration of the data captured by the inertial measurement unit, comprises:

obtaining the adjustment value of the pose of the camera based on a Jacobian matrix formed based on the second-order statistics of the data captured by the camera and the pre-integration of the data captured by the inertial measurement unit.

16. The device as claimed in claim 15, wherein, the Jacobian matrix comprising a visual Jacobian matrix and an inertial Jacobian matrix, the visual Jacobian matrix comprises a sum of a plurality of sub visual Jacobian matrices, and is denoted by the following formula of:

$$J(\xi)^T J(\xi) = \Sigma J_{C_{i,j}}{}^T J_{C_{i,j}},$$

where, $J(\xi)^T J(\xi)$ represents the visual Jacobian matrix, $\xi$ represents the pose of the camera, $J_{C_{i,j}}{}^T J_{C_{i,j}}$ represents the sub visual Jacobian matrix, and is denoted by the following formula of:

$$J_{C_{i,j}}^T J_{C_{i,j}} = \begin{bmatrix} A_{C_{i,j}}(i,i), A_{C_{i,j}}(i,j) \\ A_{C_{i,j}}(j,i), A_{C_{i,j}}(j,j) \end{bmatrix},$$

$C_{i,j}$ represents a set of matched feature points in a registered frame pair of frames i and j of color images and depth maps, $$A_{C_{i,j}}(i,i) = \sum_{k=0}^{\|C_{i,j}\|-1} J_{ik}^T J_{ik} = \begin{bmatrix} \|C_{i,j}\| I_{3\times3} & -\left[R_i \sum_{k=0}^{\|C_{i,j}\|-1} P_i^k\right]_x \\ -\left[R_i \sum_{k=0}^{\|C_{i,j}\|-1} P_i^k\right]_x & \sum_{k=0}^{\|C_{i,j}\|-1} [R_i P_i^k]_x^T [R_i P_i^k]_x \end{bmatrix},$$

$$A_{C_{i,j}}(i,j) = \sum_{k=0}^{\|C_{i,j}\|-1} J_{ik}^T J_{jk} = \begin{bmatrix} \|C_{i,j}\| I_{3\times3} & -\left[R_j \sum_{k=0}^{\|C_{i,j}\|-1} P_j^k\right]_x \\ -\left[R_i \sum_{k=0}^{\|C_{i,j}\|-1} P_i^k\right]_x & \sum_{k=0}^{\|C_{i,j}\|-1} [R_i P_i^k]_x^T [R_j P_j^k]_x \end{bmatrix},$$

$$A_{C_{j,i}}(j,i) = \sum_{k=0}^{\|C_{i,j}\|-1} J_{jk}^T J_{ik} = \begin{bmatrix} \|C_{i,j}\| I_{3\times3} & -\left[R_i \sum_{k=0}^{\|C_{i,j}\|-1} P_i^k\right]_x \\ -\left[R_j \sum_{k=0}^{\|C_{i,j}\|-1} P_j^k\right]_x & \sum_{k=0}^{\|C_{i,j}\|-1} [R_j P_j^k]_x^T [R_i P_i^k]_x \end{bmatrix},$$

$$A_{C_{j,j}}(j,j) = \sum_{k=0}^{\|C_{i,j}\|-1} J_{jk}^T J_{jk} = \begin{bmatrix} \|C_{i,j}\|I_{3\times 3} & -\left[R_j \sum_{k=0}^{\|C_{i,j}\|-1} P_j^k\right]_x \\ -\left[R_j \sum_{k=0}^{\|C_{i,j}\|-1} P_j^k\right]_x & \sum_{k=0}^{\|C_{i,j}\|-1} [R_j P_j^k]_x^T [R_j P_j^k]_x \end{bmatrix},$$

k represents the matched feature point,
$\|C_{i,j}\|$ represents a number of the set of matched feature points,
$I_{3\times 3}$ represents a unit matrix of 3×3,
$R_j$ represents a rotation matrix of frame j,
$R_i$ represents a rotation matrix of frame i,
$P_j^k$ represents a point coordinate of matched feature point k in frame j,
$P_i^k$ represents a point coordinate of matched feature point k in frame i,
x represents a skew symmetric matrix.

17. The device as claimed in claim 16, wherein the inertial Jacobian matrix is obtained by:
  obtaining a residual function of inertial status variables by combining the pose of the camera; and
  obtaining the inertial Jacobian matrix of the residual function to the pose of the camera and the inertial status variables.

18. The device as claimed in claim 17, wherein the adjustment value of the pose of the camera is a sum of the visual Jacobian matrix and the inertial Jacobian matrix, and the adjustment value of bias of the inertial measurement unit is obtained based on the inertial Jacobian matrix.

19. A non-transitory computer-readable storage medium having stored therein instructions that, when executed by a processor of a terminal, causes the terminal to perform a 3-dimensional reconstruction method, the terminal comprising a camera and an inertial measurement unit,
the method comprising:
  obtaining data captured by the camera and data captured by the inertial measurement unit;
  obtaining a pose of the camera based on the data captured by the camera and the data captured by the inertial measurement unit;
  obtaining an adjustment value of the pose of the camera and an adjustment value of bias of the inertial measurement unit based on a second-order statistics of the data captured by the camera and a pre-integration of the data captured by the inertial measurement unit;
  updating the pose of the camera based on the adjustment value of the pose of the camera;
  determining whether the adjustment value of bias of the inertial measurement unit is less than a preset value;
  in response to the adjustment value of bias of the inertial measurement unit being greater than or equal to the preset value, determining that a current loop for 3-dimensional reconstruction is an error loop, the current loop being a connection of the pose of the camera with a previous pose of the camera;
  removing the error loop; and
  constructing a 3-dimensional model for surroundings of the camera based on the updated pose of the camera and remaining loops.

20. The non-transitory computer-readable storage medium as claimed in claim 19, wherein the method further comprises:
  in response to the adjustment value of bias of the inertial measurement unit being less than the preset value, determining that the current loop for 3-dimensional reconstruction is a right loop, and remaining the current loop for 3-dimensional reconstruction.

* * * * *